United States Patent
Lepro Chavez et al.

(10) Patent No.: US 11,884,544 B2
(45) Date of Patent: Jan. 30, 2024

(54) COVALENT REINFORCEMENT OF CARBON NANOTUBE ASSEMBLIES

(71) Applicant: Lawrence Livermore National Security, LLC, Livermore, CA (US)

(72) Inventors: Xavier N. Lepro Chavez, Dublin, CA (US); Chantel M. Aracne-Ruddle, Livermore, CA (US); Leonardus Bimo Bayu Aji, Livermore, CA (US); Sergei O. Kucheyev, Oakland, CA (US); Michael Stadermann, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 17/844,492

(22) Filed: Jun. 20, 2022

(65) Prior Publication Data
US 2023/0101816 A1    Mar. 30, 2023

Related U.S. Application Data

(62) Division of application No. 15/867,576, filed on Jan. 10, 2018, now Pat. No. 11,479,467.

(51) Int. Cl.
| | |
|---|---|
| B32B 9/00 | (2006.01) |
| C01B 32/168 | (2017.01) |
| B01J 19/08 | (2006.01) |
| C01B 32/16 | (2017.01) |
| C01B 32/164 | (2017.01) |
| B82Y 40/00 | (2011.01) |
| B82Y 30/00 | (2011.01) |

(52) U.S. Cl.
CPC ........... *C01B 32/168* (2017.08); *B01J 19/084* (2013.01); *C01B 32/16* (2017.08); *C01B 32/164* (2017.08); *B01J 2219/0879* (2013.01); *B82Y 30/00* (2013.01); *B82Y 40/00* (2013.01); *C01B 2202/08* (2013.01); *Y10S 977/748* (2013.01); *Y10S 977/843* (2013.01); *Y10S 977/847* (2013.01); *Y10T 428/30* (2015.01)

(58) Field of Classification Search
CPC ....... B82Y 30/00; B82Y 40/00; Y10T 428/30; Y10S 977/742
USPC ....................................... 428/408; 423/447.1
See application file for complete search history.

(56) References Cited

U.S. PATENT DOCUMENTS

| | | |
|---|---|---|
| 2008/0170982 A1 | 7/2008 | Zhang et al. |
| 2017/0247257 A1 | 8/2017 | Jung et al. |

OTHER PUBLICATIONS

Final Office Action on U.S. Appl. No. 15/867,576 dated Dec. 16, 2021.
Final Office Action on U.S. Appl. No. 15/867,576 dated Dec. 24, 2020.
Fornasiero, F. et al. (2016) "Hierarchical reinforcement of randomly-oriented carbon nanotube mats by ion irradiation," Carbon 99:491-501.

(Continued)

*Primary Examiner* — Daniel H Miller
(74) *Attorney, Agent, or Firm* — Foley & Lardner LLP (57) ABSTRACT

Disclosed here is a method of fabricating a covalently reinforced carbon nanotube (CNT) assembly. The method includes producing a CNT assembly by pulling entangled CNTs from a CNT array fabricated on a substrate, the CNT assembly including a plurality of CNTs that are aligned; and creating covalent bonding between the CNTs of the CNT assembly by applying a high energy ion irradiation to the CNT assembly.

13 Claims, 10 Drawing Sheets

(56) References Cited

OTHER PUBLICATIONS

Non-Final Office Action on U.S. Appl. No. 15/867,576 dated Jun. 10, 2021.
Non-Final Office Action on U.S. Appl. No. 15/867,576 dated Jun. 11, 2020.
Notice of Allowance on U.S. Appl. No. 15/867,576 dated Apr. 1, 2022.
Zhang, M. et al. (2004) "Multifunctional Carbon Nanotube Yarns by Downsizing an Ancient Technology," Science 306(5700):1358-1361.
Zhang, M. et al. (2005) "Strong, Transparent, Multifunctional, Carbon Nanotube Sheets," Science 309(5738):1215-1219.

705 Fabricate the CNT array by growing CNTs on a substrate through a chemical vapor deposition (CVD) process 710 Produce a CNT assembly including one or more CNT yarns by pulling and twisting entangled CNTs from the CNT array fabricated on the substrate 715 Reduce inter-nanotube distances by wet-densifying the CNT yarns using a solvent 720 Create covalent bonding between the CNTs of the CNT yarn assembly by applying a high energy ion irradiation to the CNT yarn assembly

805 Fabricate the CNT array by growing CNTs on a substrate through a chemical vapor deposition (CVD) process

↓

810 Produce a CNT assembly including one or more CNT sheets by pulling entangled CNTs from an edge of the CNT array fabricated on the substrate using a dry-state spinning mechanism

↓

815 Overlay the CNT sheets in multiple orientations such that an overall thickness of the CNT assembly is from 1 μm to 10 μm

↓

820 Reduce inter-nanotube distances by exposing the CNT sheets to a mist or aerosol of at least one solvent

↓

825 Create covalent bonding between the CNTs of the CNT sheet assembly by applying a high energy ion irradiation to the CNT sheet assembly

FIG. 8

COVALENT REINFORCEMENT OF CARBON NANOTUBE ASSEMBLIES

CROSS REFERENCE TO RELATED APPLICATION

This application is a divisional of U.S. patent application Ser. No. 15/867,576, filed on Jan. 10, 2018, the contents of which is incorporated herein by reference in its entirety.

FEDERAL FUNDING STATEMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

The high strength and thermal conductivities of individual carbon nanotubes (CNTs) are utilized as high performance materials. A CNT array has a self-assembly property that orientates the nanotubes parallel to a common direction. Using the self-assembly property, a CNT array can be assembled as CNT aerogels using techniques such as direct sheet drawing and spinning. The produced CNT aerogels are strong while still exhibiting air-like volumetric densities. Upon twisting or spinning, the CNT aerogels can be transformed into flexible, strong micrometric-yarns or sheets with a microstructure that resembles wool or cotton threads used in the textile industry.

In such assemblies, individual carbon nanotubes are mechanically entangled together into bundles through non-covalent interactions and van der Waals forces. Material failure is driven by disentanglement rather than breaking of covalent networks of individual CNTs. Therefore, the strength of the inter-nanotube connections limits the overall mechanical strength of the CNT derived material such as the CNT yarns and sheets.

SUMMARY

One aspect of some embodiments of the present disclosure relates to a technology for increasing the overall mechanical strength of the CNT derived material such as the CNT yarns and sheets by introducing strong inter-nanotube interactions via covalent bonding. Mechanical strength of CNT derived materials can be increased by inducing covalent bonding between adjacent individual nanotubes by bombarding (also referred to as irradiating) the CNT structures with high energy ions such as $^4He^+$ ions. Ion bombardment generates highly energetic defects on individual CNTs that lead to formation of covalent bonds among adjacent CNTs if the adjacent CNTs are in intimate contact with each other. Once nanotubes are bonded covalently to each other at entanglement points, slippage of the CNT derived assemblies under tension is reduced, thus resulting in carbon-based materials with increased mechanical strength.

Another aspect of some embodiments of the present disclosure relates to a method of fabricating a covalently reinforced CNT assembly. The method includes producing a CNT assembly by pulling entangled CNTs from a CNT array fabricated on a substrate, the CNT assembly including a plurality of CNTs that are aligned; and creating covalent bonding between the CNTs of the CNT assembly by applying a high energy ion irradiation to the CNT assembly.

Yet another aspect of some embodiments of the present disclosure relates to a CNT based material. The CNT based material includes a plurality of CNTs that are aligned. Adjacent CNTs of the plurality of CNTs are covalently bonded between each other. The plurality of CNT form one or more CNT yarns or one or more CNT sheets.

These and other features, together with the organization and manner of operation thereof, will become apparent from the following detailed description when taken in conjunction with the accompanying drawings.

DETAILED DESCRIPTION

Reference will now be made in detail to some specific embodiments of the invention contemplated by the inventors for carrying out the invention. Certain examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

According to at least some embodiments of the present disclosure relates to a method to increase the overall mechanical resistance of self-supported, pure CNT assemblies by inducing covalent cross-linkage between adjacent CNTs through high-energy ion bombardment (also referred to as ion irradiation).

According to at least some embodiments of the present disclosure, CNTs in CNT yarns or aerogel sheets can be crosslinked covalently by exposing the CNTs to ion irradiation of, e.g., $^4He^+$ ions having an energy level of about 3 MeV. CNT assemblies retain overall shapes after irradiation. Unlike conventional CNT assemblies that need additional treatment, the CNT assemblies after irradiation can be handled without the need of additional provisions.

In some embodiments, via the ion irradiation with doses of $10^{14}$ cm$^{-2}$, covalent crosslinked CNTs are produced in CNT yarns. Due to the covalent crosslinks, the CNT yarns increase their stiffness by about 0.37 GN/kg (e.g., from about 0.93 to about 1.3 GN/kg) and increase their Young's modulus by about 4.6 GPa (e.g., from about 9.5 to about 14 GPa).

In some embodiments, the degree of mechanical enhancement in CNT sheets and/or yarns may be a function of the ion dose to which CNTs are exposed, and may not monotonically increase with irradiation dose. In some embodiments, twisted yarns and sheets exposed to irradiation doses ranging from $10^{13}$ cm$^{-2}$ to $10^{16}$ cm$^{-2}$ exhibit optimal mechanical reinforcement in the CNT sheets and/or yarns.

Preparation of Carbon Nanotube Sheets

Figure 1A:
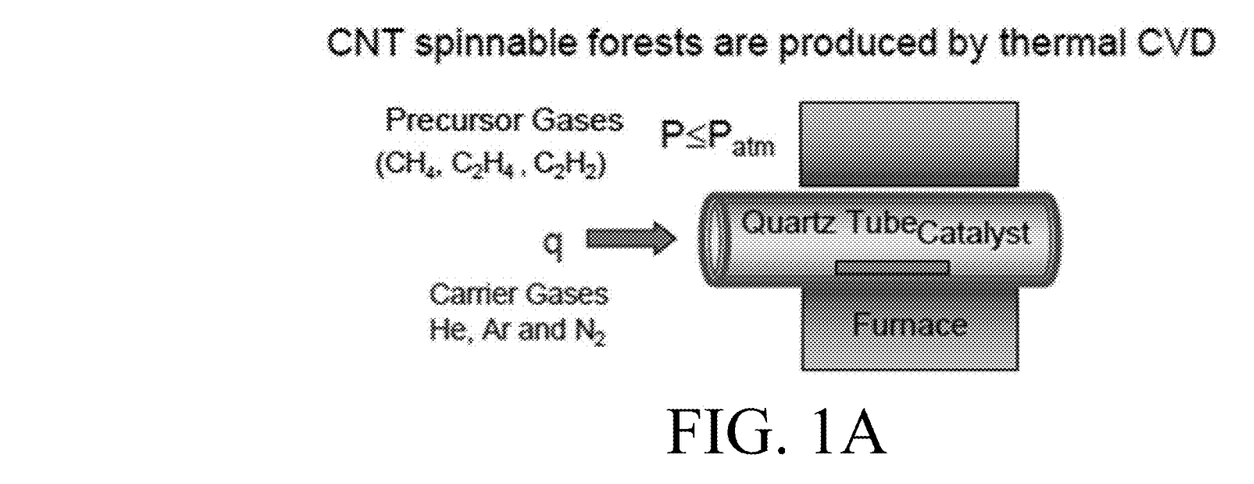
FIG. 1A illustrates a sample chemical vapor deposition process for manufacturing carbon nanotubes.

In some embodiments, raw CNT arrays or forests can be fabricated by processes such as chemical vapor deposition (CVD). FIG. 1A illustrates a sample chemical vapor deposition process for manufacturing carbon nanotubes. As shown in FIG. 1A, precursor gases (such as $CH_4$, $C_2H_4$, $C_2H_2$) and carrier gases (He, Ar and $N_2$) are supplied into a quartz tube disposed with a catalyst-prepared substrate. During the CVD process, the quartz tube is heated by a furnace while the precursor gases and carrier gases are continuously supplied to grow the CNTs on a substrate.

Figure 1B:
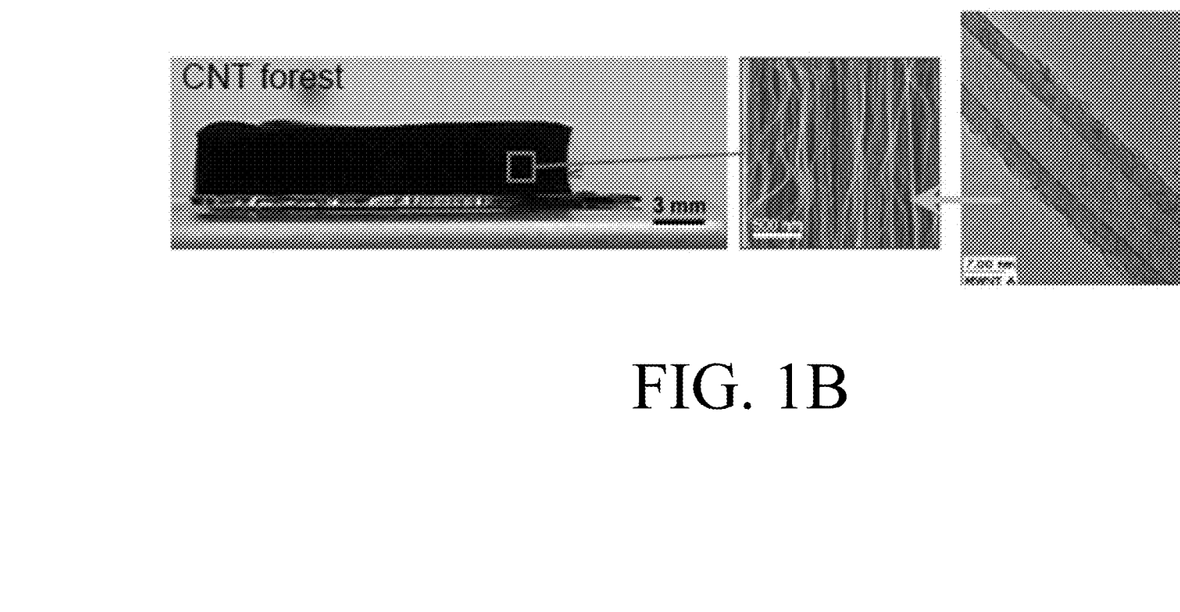
FIG. 1B illustrates images of a CNT forest.

The result of the CVD process is a raw CNT array or a CNT forest grown on the substrate. FIG. 1B illustrates images of a CNT forest. In a CNT forest, CNTs grow from a substrate in a manner resembling tree trunks in a dense forest and have nearly the same height.

Figure 1C:
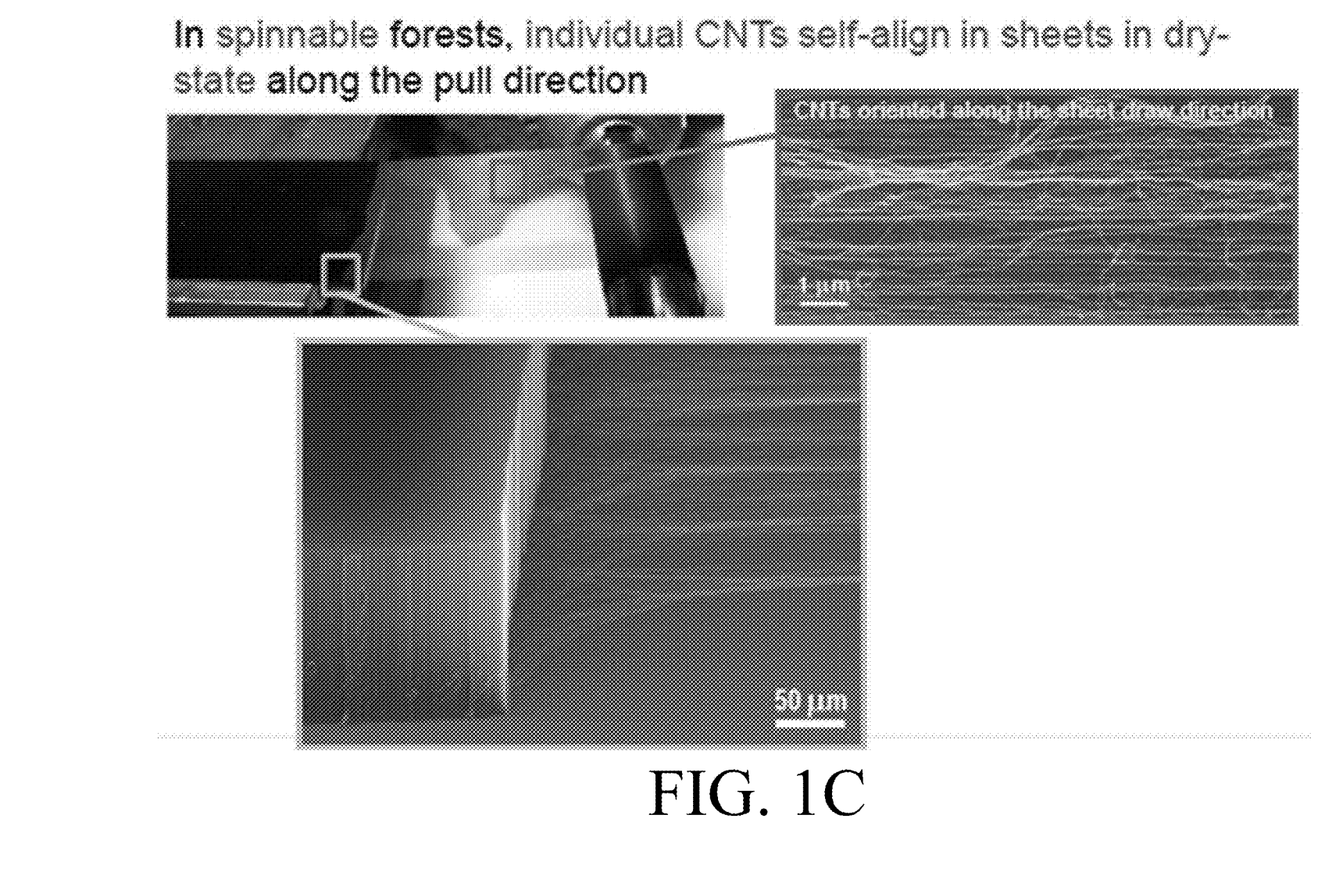
FIG. 1C illustrates images of a CNT sheet being formed by pulling from the edge of a CNT forest.

Then, free-standing sheets of preferentially aligned CNTs can be produced by pulling from the edge of the raw CNT arrays or CNT forests. FIG. 1C illustrates images of a CNT sheet being formed by pulling from the edge of a CNT forest. As shown in FIG. 1C, by a dry-state drawing mechanism, the CNTs self-align in a sheet form along the pull direction. The microscopic images of FIG. 1C confirm that the CNTs are oriented along the sheet draw direction (i.e., pull direction).

Figure 1D:
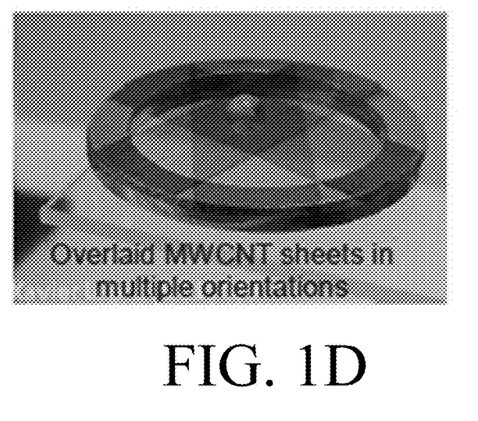
FIG. 1D illustrates that CNT sheets can be overlaid in different orientations.
Figure 1E:
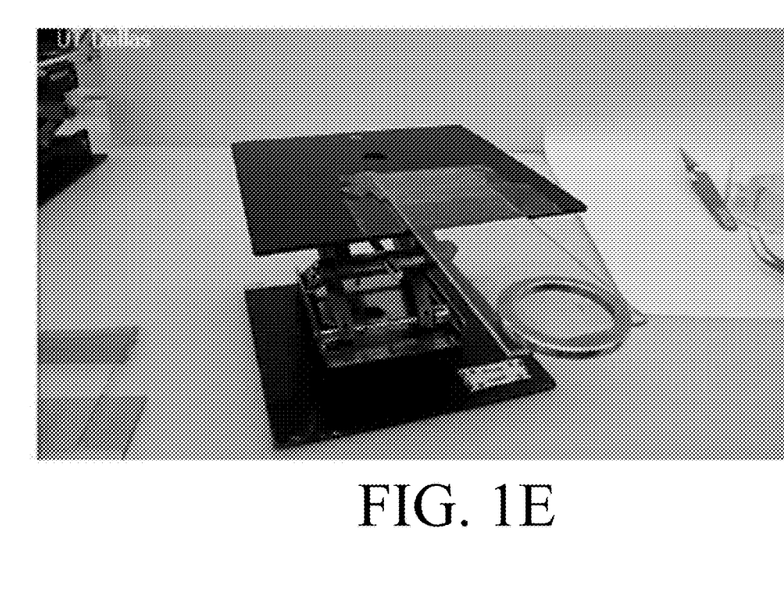
FIG. 1E illustrates that a CNT sheet can be transferred to a substrate.

The CNT sheets can be rolled, kept free-standing or transferred on to a suitable substrate. FIG. 1D illustrates that CNT sheets can be overlaid in different orientations. In some embodiments, the thickness of the overlaid CNT sheets is from 1 µm to 10 µm (e.g., 5 µm). FIG. 1E illustrates that a CNT sheet can be transferred to a substrate.

Preparation of Carbon Nanotube Yarns

Figure 2A:
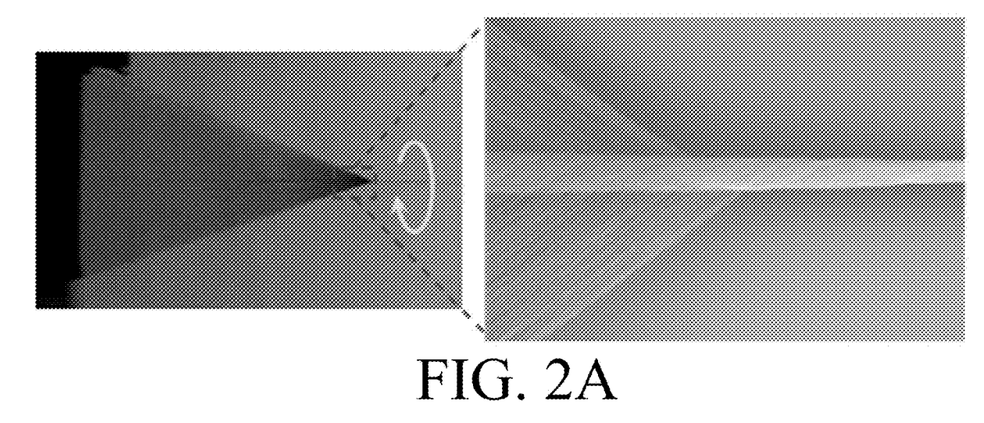
FIG. 2A illustrates images of a process that a CNT forest is spun in dry-state continuously into a CNT yarn.
Figure 2B:
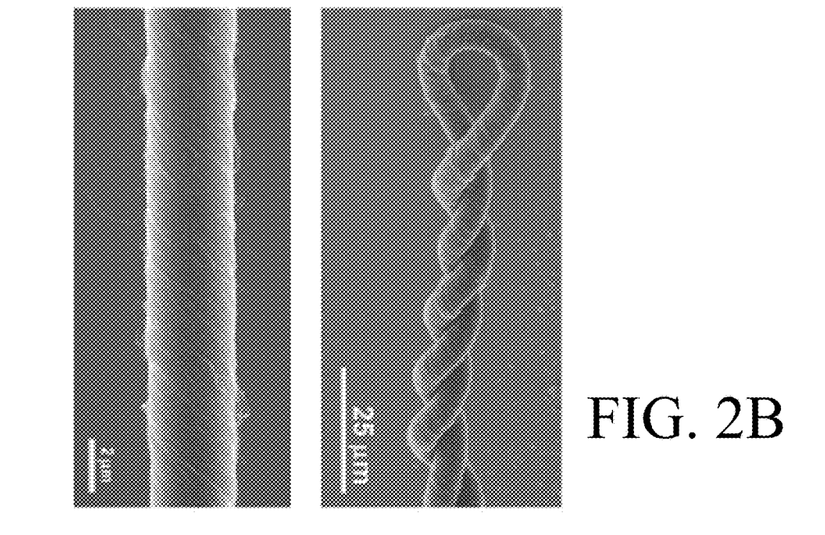
FIG. 2B illustrates microscopic images of a CNT yarn.

CNT Yarns can be produced by either applying a twist motion to pulled CNT sheets or by directly spinning (i.e., twisting while pulling) from CNT forests. For example, CNT yarns can be produced by wet spinning or dry-state spinning of single-walled nanotubes (SWNTs) and/or multi-walled nanotubes (MWNTs). FIG. 2A illustrates images of a process where a CNT forest is spun in dry-state continuously into a CNT yarn. The resulting CNT yarn is flexible, mechanically strong, thermally and electrically conductive. FIG. 2B illustrates microscopic images of a CNT yarn.

Wet Densifying or Mist Densifying

Inter-nanotube distances in the CNT yarns can be reduced by wet-densifying the CNT yarns using suitable solvents (e.g. alcohol, acetone, etc.). CNT sheets assemblies, on the other hand, can be prepared by placing individual CNT sheets on top each other in orthogonal direction or any other rotated angle on an open support. Inter-nanotube distance can be minimized by exposing the sheets to a mist or aerosol of a solvent or a mixture of solvents (e.g. alcohol, acetone, etc.) to achieve densification among CNT bundles and increase contacting areas among nanotubes.

Ion Irradiation

Following preparation of the CNT yarns or sheets, the CNT-based samples (yarns or sheets) are placed into a vacuum chamber and exposed to 3 MeV $^4He^+$ irradiation with a constant beam flux of, e.g., $10^{12}$ cm$^{-2}$ s$^{-1}$ for various time frames until a specific irradiation dose per cm$^2$ is attained on the sample. Cross-sections of the irradiation can be selected in a way that Helium ions pass through the overall thickness of the specimen so that the irradiation can generate defects uniformly through the sample without inducing ion implantation. After the irradiation, samples can be vented to atmospheric conditions and tested for their mechanical properties. Irradiated CNT samples are stable under room conditions of light and moisture and do not exhibit any observable additional chemical reactivity compared to the untreated counterparts. In some embodiments, the energy level of the $^4He^+$ irradiation is from 1 MeV to 10 MeV. In some embodiments, the dose of the ion irradiation is from $10^{13}$ ions cm$^{-2}$ to $10^{16}$ ions cm$^{-2}$.

At least one advantage of the irradiation treatment is that the ion irradiation induces covalently crosslinked CNT assemblies without the need of introducing any other substances (e.g., polymers or solvents) to the assemblies. The mechanically reinforced CNT assemblies remain substantially or purely carbon-based. In some other embodiments, ion irradiation can be used to enhance mechanical strength of composites including CNTs and other substances (e.g., polymers). In such case, ion irradiation may promote covalent bonding among crosslinked nanotubes as well as covalent bonding between CNTs and polymers. The ion irradiation may be introduced to the sample prior to or after the CNTs are treated with substances such as polymers.

In some alternative embodiments, the CNT yarns or sheet may be irradiated using various ions (such as He, C, and Ar), with various dosages (i.e. $10^{12}$ to $10^{16}$), at various energy levels ranging from few keV to several MeV.

Raman Spectroscopy of Irradiated CNT Assemblies

Figure 3:
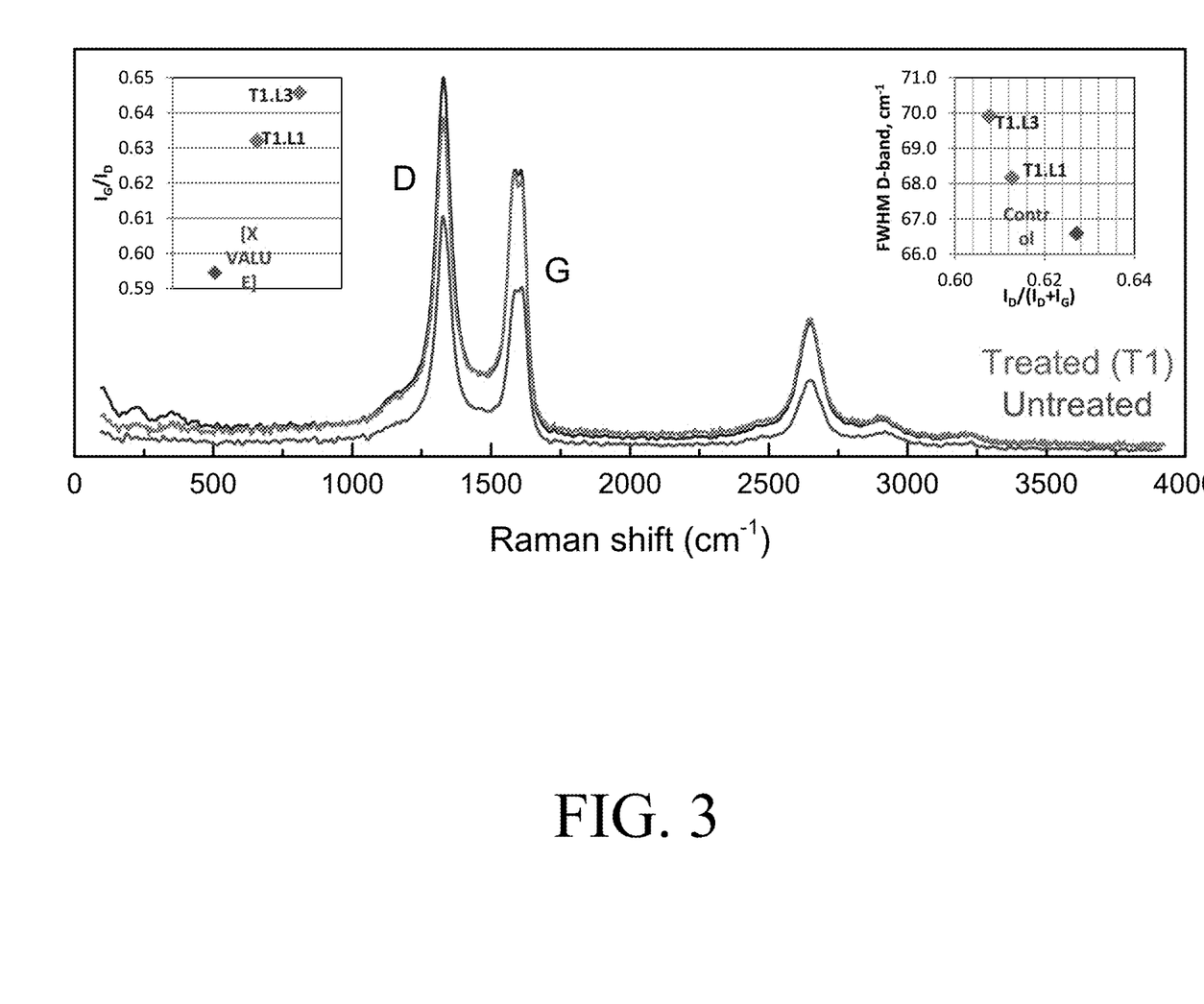
FIG. 3 illustrates a Raman spectroscopy of two irradiation treated CNT assemblies and an untreated CNT assembly.

FIG. 3 illustrates a Raman spectroscopy of two irradiation treated CNT assemblies (with different doses) and an untreated CNT assembly. The G bands of the Raman spectroscopy correspond to in-plane vibrations of sp$^2$ bonded carbon atoms on the surface of the CNTs (e.g., carbon atoms of ideal CNTs without defects). The D bands of the Raman spectroscopy correspond to out-of-plane vibrations of spa bonded carbon atoms attributed to the presence of structural defects on the surface of the CNTs.

Thus, as the Raman spectroscopy of FIG. 3 suggests, the intensities of D bands of irradiation treated CNT assemblies are higher than the intensity of D band of untreated CNT assembly. This suggests that additional defects are created on the surfaces of the CNTs via ion irradiation. Therefore, the Raman spectroscopy shows that irradiation induces changes in the carbon nanotube lattice network, which is consistent with the prediction of mechanical reinforcement due to inter-nanotube covalent bonding.

Indentation Test

Figure 4A:
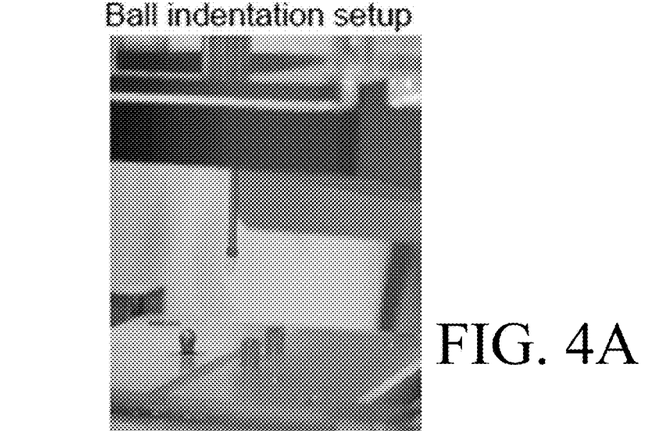
FIG. 4A illustrates a ball indentation setup where a test specimen can be placed and tested.
Figure 4B:
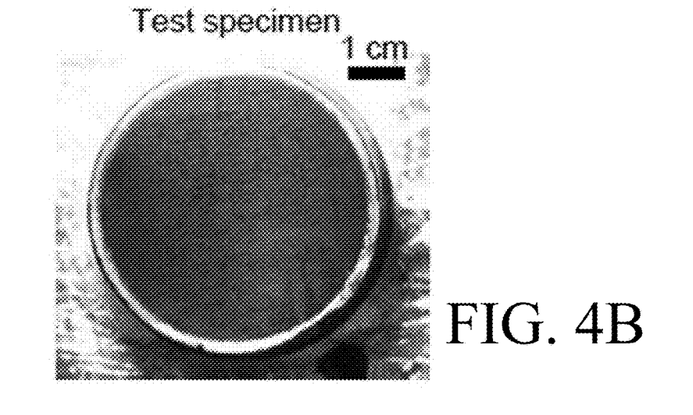
FIG. 4B illustrates a test specimen ready for indentation test.
Figure 4C:
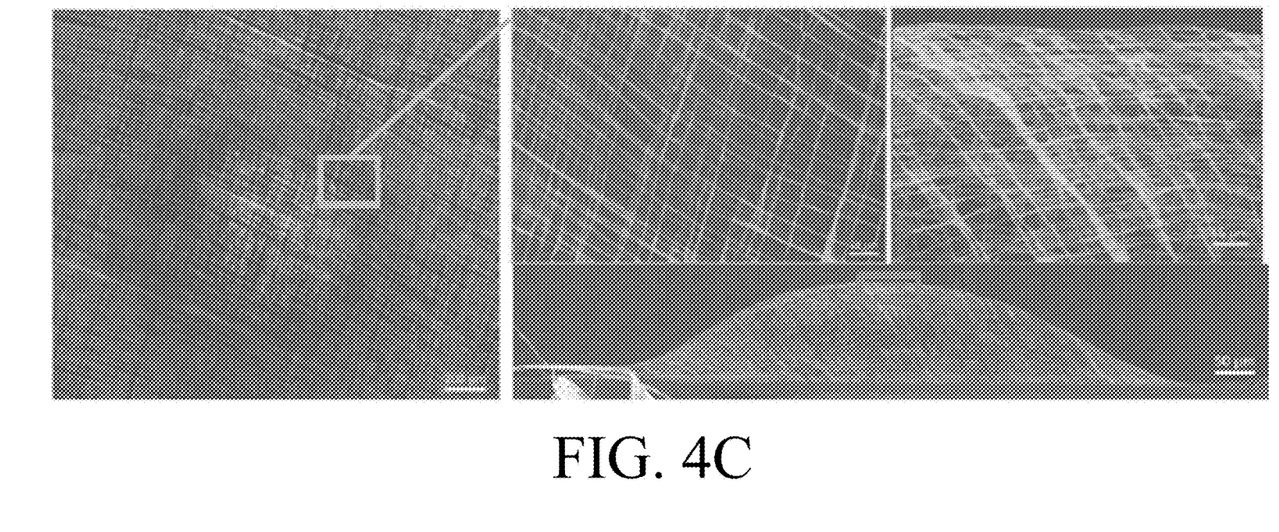
FIG. 4C illustrates images of a CNT test specimen is being tested using the setup of FIG. 4A.

FIG. 4A illustrates a ball indentation setup, where a test specimen can be placed and tested. FIG. 4B illustrates a test specimen ready for indentation test. During the indentation test (also referred to indentation hardness test), the test specimen is tested to determine the hardness of a material to deformation. The test specimen is indented until an impression is formed. In some embodiments, the indentation hardness may correlate (e.g., linearly) with tensile strength. During the indentation test, a ball is inserted against a surface of the test specimen to cause an indentation. The forces corresponding to the indentation depths are recorded. FIG. 4C illustrates images of a CNT test specimen is being tested using the setup of FIG. 4A.

Figure 5:
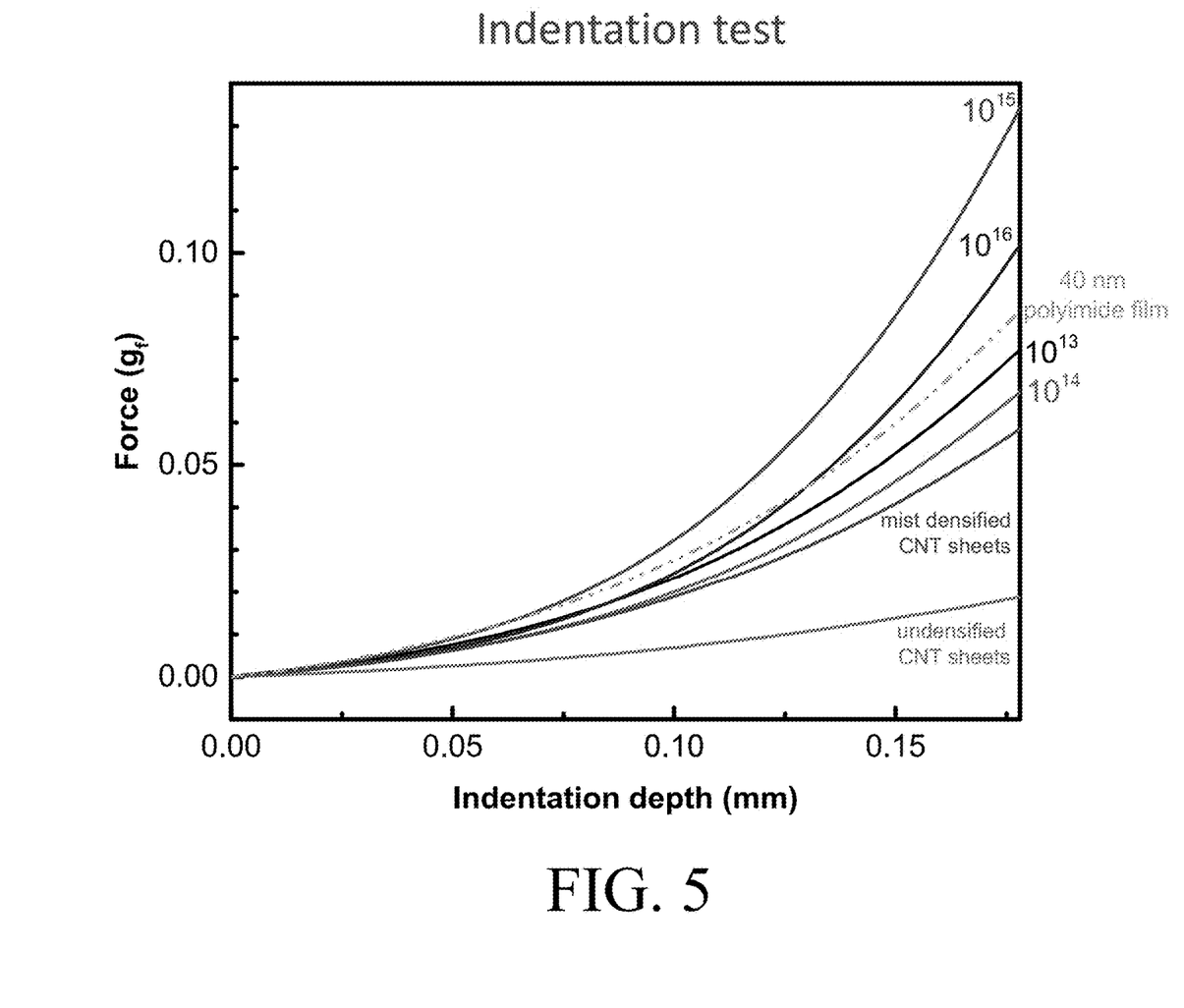
FIG. 5 illustrates indentation test results for various types of test specimens.

FIG. 5 illustrates indentation test results for various types of test specimens. FIG. 5 shows curves corresponding to a specimen of undensified CNT sheets, a specimen of mist densified CNT sheets, a 40-nm polyimide film, a specimen of CNT sheets exposed to ion irradiation with a dose of $10^{13}$ $cm^{-2}$, a specimen of CNT sheets exposed to ion irradiation with a dose of $10^{14}$ $cm^{-2}$, a specimen of CNT sheets exposed to ion irradiation with a dose of $10^{15}$ $cm^{-2}$, and a specimen of CNT sheets exposed to ion irradiation with a dose of $10^{16}$ $cm^{-2}$.

As illustrated in FIG. 5, in some embodiments, the degree of mechanical enhancement in CNT sheets and/or yarns is a function of the ion dose to which CNTs are exposed, and may not monotonically increase with irradiation dose. The mechanical hardness of specimens of CNT sheets exposed to ion irradiation with doses of $10^{15}$ $cm^{-2}$ and $10^{16}$ $cm^{-2}$ is superior to the mechanical hardness of the 40-nm polyimide film. The mechanical hardness of specimens of CNT sheets exposed to ion irradiation with doses of $10^{13}$ $cm^{-2}$ and $10^{13}$ $cm^{-2}$ is superior to the mechanical hardness of the untreated CNT sheets (undensified or mist densified), but not as strong as the 40-nm polyimide film. One reason may be that excessive defects caused by a high dose irradiation may have a negative effect on structural integrity of the CNTs while the benefit of creating covalent crosslinks through defects diminishes as the number of defects increase after a certain point.

Tensile Strength Test

Figure 6:
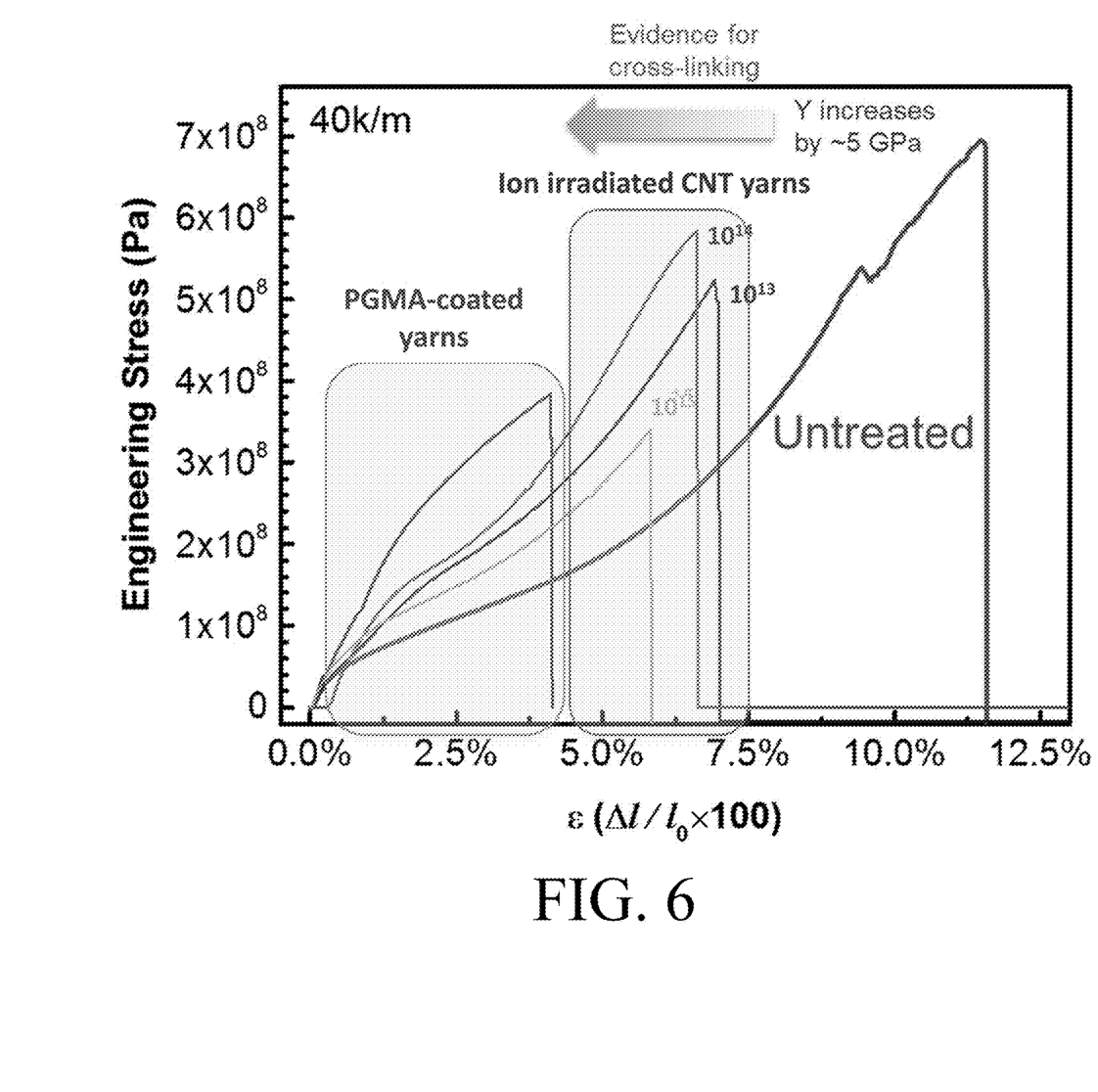
FIG. 6 illustrates tensile test results for various types of test specimens.

FIG. 6 illustrates tensile test results for various types of test specimens. FIG. 5 shows curves corresponding to a specimen of untreated CNT yarns, a specimen of CNT yarns exposed to ion irradiation with a dose of $10^{13}$ $cm^{-2}$, a specimen of CNT yarns exposed to ion irradiation with a dose of $10^{14}$ $cm^{-2}$, a specimen of CNT yarns exposed to ion irradiation with a dose of $10^{15}$ $cm^{-2}$ and a specimen of PGMA (Poly(Glycidyl Methacrylate))-coated CNT yarns. Note that the mass of the specimen of PGMA-coated CNT yarns being tested is different from the mass of the specimen of irradiated CNT yarns. As shown in FIG. 6, due to the covalent crosslinking between CNTs, the Young's modulus of the specimens of CNT yarns exposed to ion irradiation is higher than the Young's modulus of the specimen of untreated CNT yarns, by at least 5 GPa.

Sample Method of Fabricating Covalently Reinforced CNT Yarn Assembly

Figure 7:
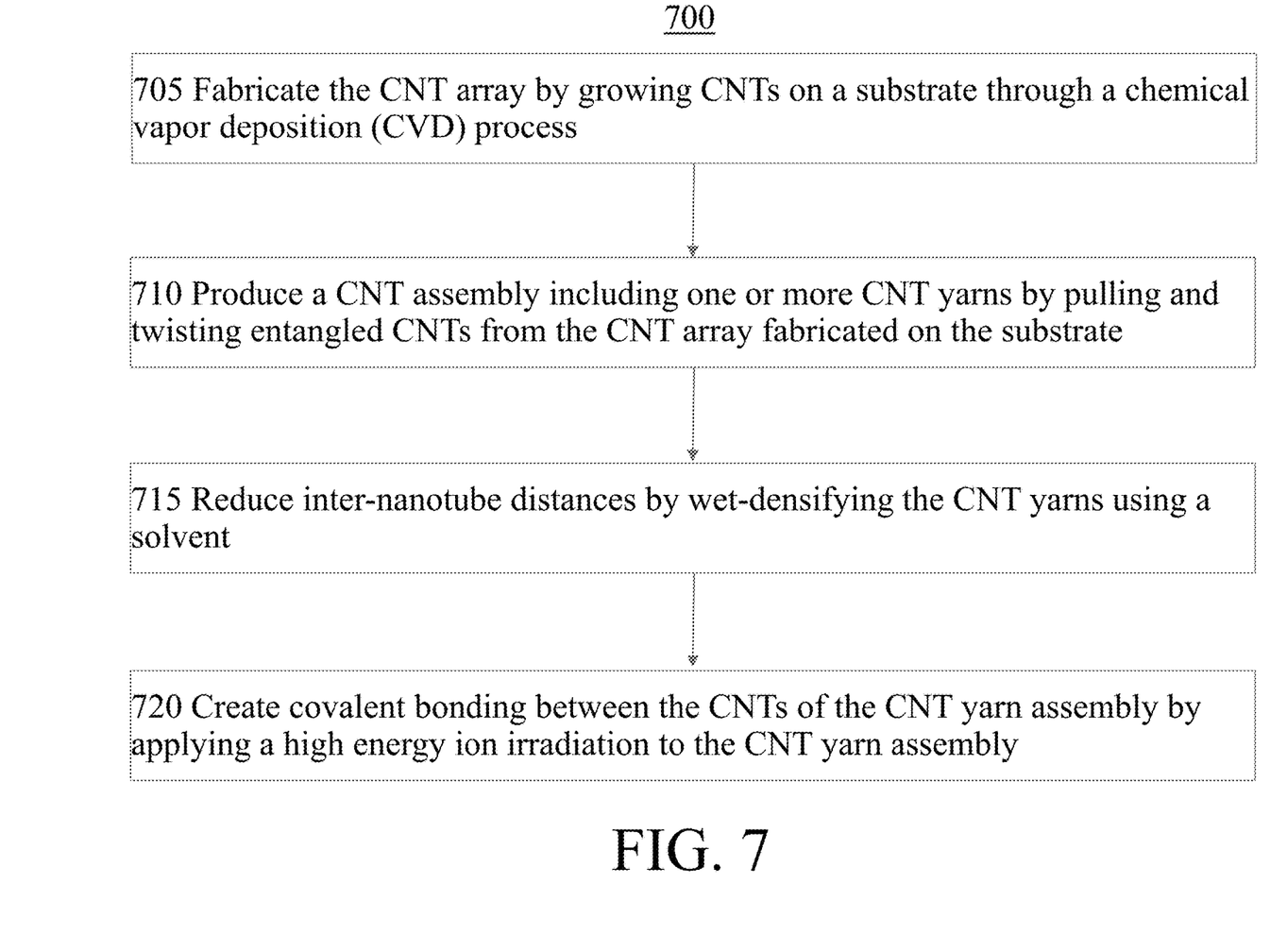
FIG. 7 illustrates a method of fabricating a covalently reinforced CNT yarn assembly.

FIG. 7 illustrates a method of fabricating a covalently reinforced CNT yarn assembly. At step 705, the process 700 fabricates the CNT array by growing CNTs on a substrate through a chemical vapor deposition (CVD) process.

At step 710, the process 700 produces a CNT assembly including one or more CNT yarns by pulling and twisting entangled CNTs from the CNT array fabricated on the substrate. Each CNT yarn includes a plurality of CNTs that are aligned. In some embodiments, a diameter of the CNT yarns may be from 1 μm to 10 μm.

At step 715, the process 700 reduces inter-nanotube distances by wet-densifying the CNT yarns using a solvent.

At step 720, the process 700 creates covalent bonding between the CNTs of the CNT yarn assembly by applying a high energy ion irradiation to the CNT yarn assembly. The covalent bonding induces a high stiffness in the CNT yarn assembly. In some embodiments, the high energy ion irradiation includes an irradiation of $^4He^+$ ions having an energy level of about 1-10 MeV. In some embodiments, the dosage of the high energy ion irradiation is from about $10^{13}$ ions per $cm^2$ to about $10^{16}$ ions per $cm^2$. The dosage of the high energy ion irradiation may be determined such that the high energy ion irradiation creates defects on the CNTs leading to covalent bonding between the CNTs, without introducing excessive defects detrimental to mechanical strengths of the CNTs. An irradiation cross-section of the high energy ion irradiation may be selected such that the ions of the high energy ion irradiation pass through an overall thickness of the CNT assembly to generate defects uniformly without inducing ion implantation.

Sample Method of Fabricating Covalently Reinforced CNT Sheet Assembly

Figure 8:
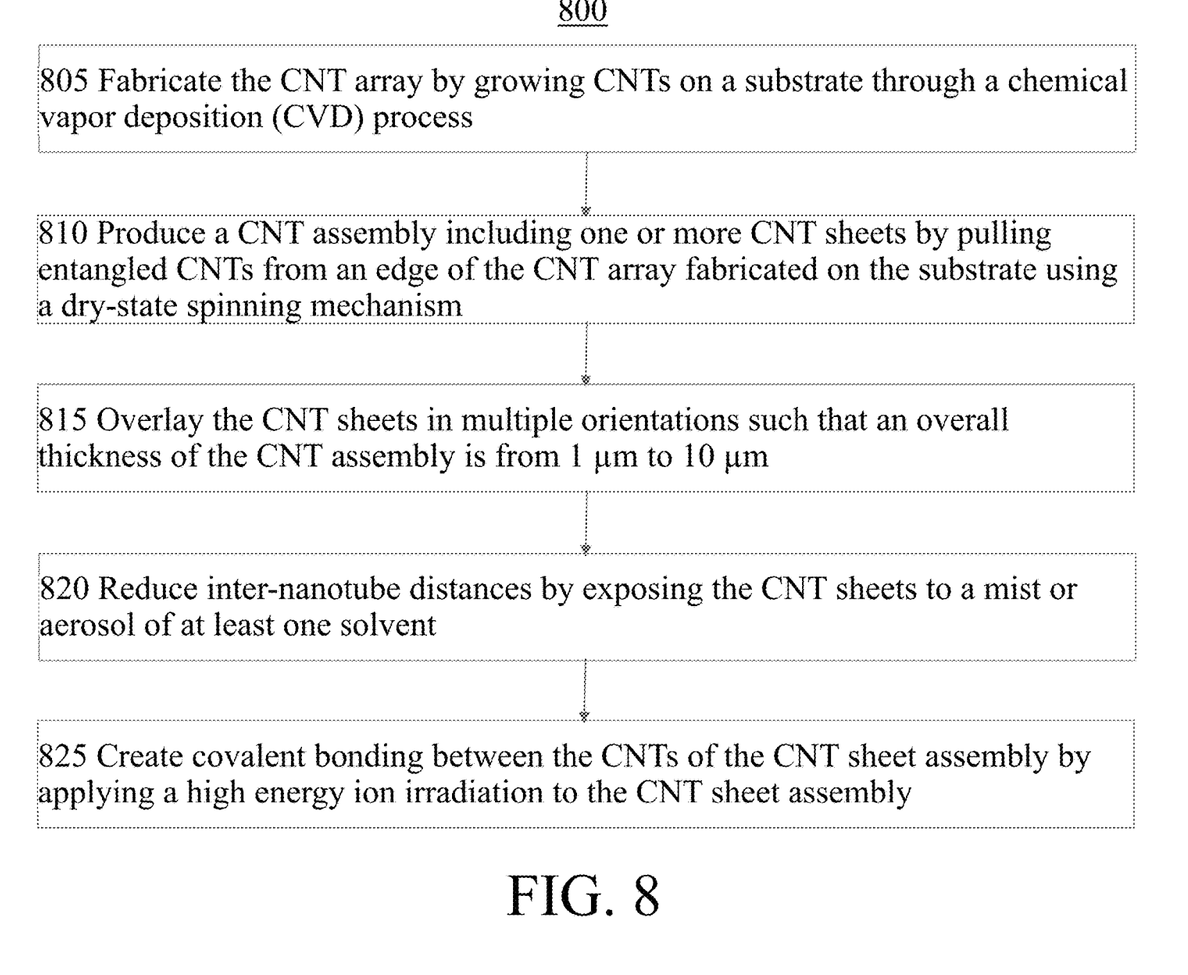
FIG. 8 illustrates a method of fabricating a covalently reinforced CNT sheet assembly.

FIG. 8 illustrates a method of fabricating a covalently reinforced CNT sheet assembly. At step 805, the process 800 fabricates the CNT array by growing CNTs on a substrate through a chemical vapor deposition (CVD) process.

At step 810, the process 800 produces a CNT assembly including one or more CNT sheets by pulling entangled CNTs from an edge of the CNT array fabricated on the substrate using a dry-state spinning mechanism. Each CNT yarn includes a plurality of CNTs that are aligned.

At step 815, the process 800 overlays the CNT sheets in multiple orientations such that an overall thickness of the CNT assembly is from 1 μm to 10 μm.

At step 820, the process 800 reduces inter-nanotube distances by exposing the CNT sheets to a mist or aerosol of at least one solvent.

At step 825, the process 800 creates covalent bonding between the CNTs of the CNT sheet assembly by applying a high energy ion irradiation to the CNT sheet assembly. The covalent bonding induces a high stiffness in the CNT yarn assembly. In some embodiments, the high energy ion irradiation includes an irradiation of $^4He^+$ ions having an energy level of about 1-10 MeV. In some embodiments, the dosage of the high energy ion irradiation is from about $10^{13}$ ions per $cm^2$ to about $10^{16}$ ions per $cm^2$. The dosage of the high energy ion irradiation may be determined such that the high energy ion irradiation creates defects on the CNTs leading to covalent bonding between the CNTs, without introducing excessive defects detrimental to mechanical strengths of the CNTs. The irradiation cross-section for the high energy ion irradiation may be selected such that the ions of the high energy ion irradiation pass through an overall thickness of the CNT assembly to generate defects uniformly without inducing ion implantation.

Sample Applications of Covalently Reinforced CNT Assemblies

In some embodiments, the strong and lightweight carbon-based arrays as disclosed may be used as capsule support materials in nuclear reaction devices such as inertial confinement fusion (ICF) devices. In an ICF device, a hohlraum is used to surround and support the nuclear reaction target to smooth out the irradiation and is irradiated with laser beam cones to bathe a fusion capsule. Conventional thin-polymeric film membranes holding the ablators inside the hohlraum have a detrimental effect in the symmetry of the implosion that decreases the energetic efficiency of each shot experiment.

The covalently strengthened CNT yarns and sheets as disclosed have similar or superior density and mechanical strength compared to the polymer membranes, and has a lower contact surface with the ablator. Therefore, covalently strengthened CNT yarns and sheets as disclosed can reduce or minimize the effect on the shockwave propagation during implosion processes. For example, in some embodiments, crosslinked CNT sheets can replace the conventional 40-nanometer thick polyimide membranes used for target support in the ICF devices. The CNT yarns can provide a superior alternative to spider-silk for tetra-cage capsule support given the similar densities (e.g., about 0.6-1.0 g/cm$^3$) and diameters (e.g., less than 10 μm). In addition, the porous carbon yarns and sheets with high tensile strength may further be used as support for separation membranes.

In some embodiments, ion irradiation can be used to enhance mechanical strength of polymer-CNT composites. In such case, ion irradiation improves load transference between CNTs and a surrounding carbon-based polymer by promoting covalent bonding among both phases rather than merely crosslinking nanotubes. At least some advantages of this approach relate to the fact that the reinforced composites may lead to fibers with larger modulus per unit weight that the currently existing fibers find applications in material design, smart textile and membrane technologies.

As used herein, the singular terms "a," "an," and "the" include plural referents unless the context clearly dictates otherwise. Thus, for example, reference to a compound can include multiple compounds unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations, which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scopes of this invention.

What is claimed is:

1. A method of fabricating a covalently reinforced carbon nanotube (CNT) assembly, comprising:
   producing a CNT assembly by pulling entangled CNTs from a CNT array fabricated on a substrate, the CNT assembly including a plurality of CNTs that are aligned; and
   inducing a high stiffness in the CNT assembly by applying a high energy ion irradiation to the CNT assembly such that an intensity of a D band of Raman spectroscopy of the CNT assembly is greater than an intensity of a G band of the Raman spectroscopy of the CNT assembly, wherein an irradiation cross-section of the high energy ion irradiation is selected such that the ions of the high energy ion irradiation pass through an overall thickness of the CNT assembly to generate defects uniformly without inducing ion implantation.

2. The method of claim 1, wherein the CNT assembly includes one or more CNT yarns or one or more CNT sheets.

3. The method of claim 1, wherein the high energy ion irradiation includes an irradiation of $^4$He$^+$ ions having an energy level of about 1-10 MeV.

4. The method of claim 3, wherein dosage of the high energy ion irradiation is from about 10$^{13}$ ions per cm$^2$ to about 10$^{16}$ ions per cm$^2$.

5. The method of claim 1, wherein the dosage of the high energy ion irradiation is determined such that the high energy ion irradiation creates defects on the CNTs leading to covalent bonding between the CNTs.

6. The method of claim 1, further comprising:
   reducing inter-nanotube distances by wet-densifying the CNT assembly using a solvent.

7. The method of claim 1, further comprising:
   overlaying a plurality of CNT sheets in multiple orientations to form the CNT assembly;
   reducing inter-nanotube distances by exposing the CNT sheets to a mist or aerosol of at least one solvent.

8. The method of claim 1, further comprising:
   fabricating the CNT array by growing CNTs on a substrate through a chemical vapor deposition (CVD) process.

9. The method of claim 1, wherein the step of producing a CNT assembly comprises:
   producing a CNT assembly including one or more CNT sheets by pulling entangled CNTs from an edge of a CNT array fabricated on a substrate using a dry-state drawing mechanism.

10. The method of claim 9, wherein the step of producing a CNT assembly further comprises:
    overlaying the CNT sheets such that an overall thickness of the CNT assembly is from 1 μm to 10 μm.

11. The method of claim 1, wherein the step of producing a CNT assembly comprises:
   producing a CNT assembly including one or more CNT yarns by pulling and twisting entangled CNTs from a CNT array fabricated on a substrate.

12. The method of claim 11, wherein a diameter of the CNT yarns is from 1 μm to 10 μm.

13. The method of claim 1, further comprising:
   applying a polymer to the CNT assembly to further reinforce the CNT assembly.

* * * * *